UNITED STATES PATENT OFFICE.

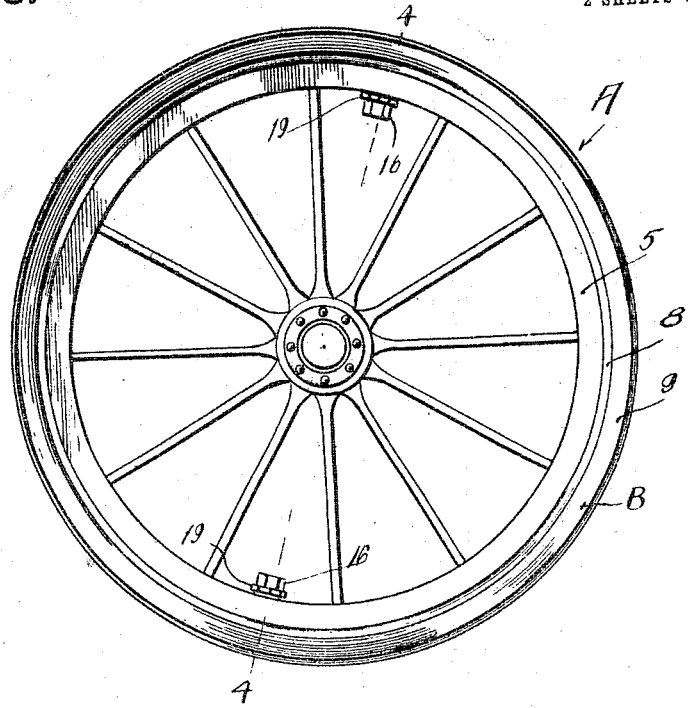
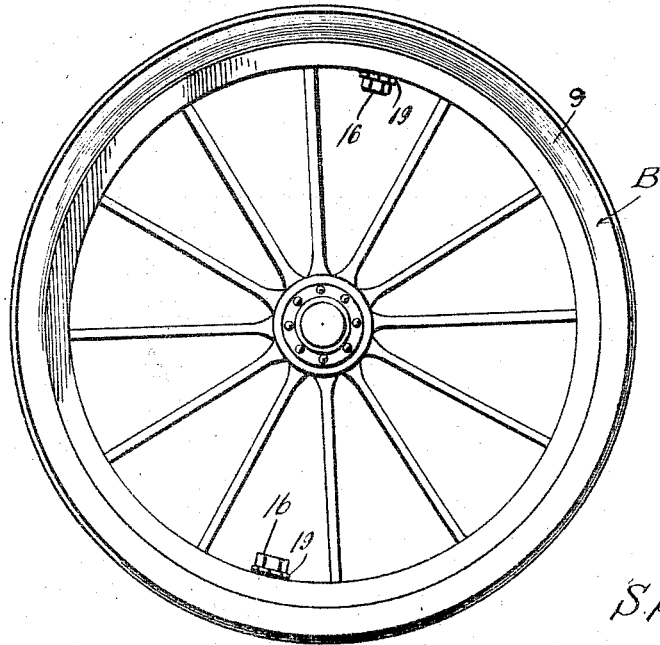

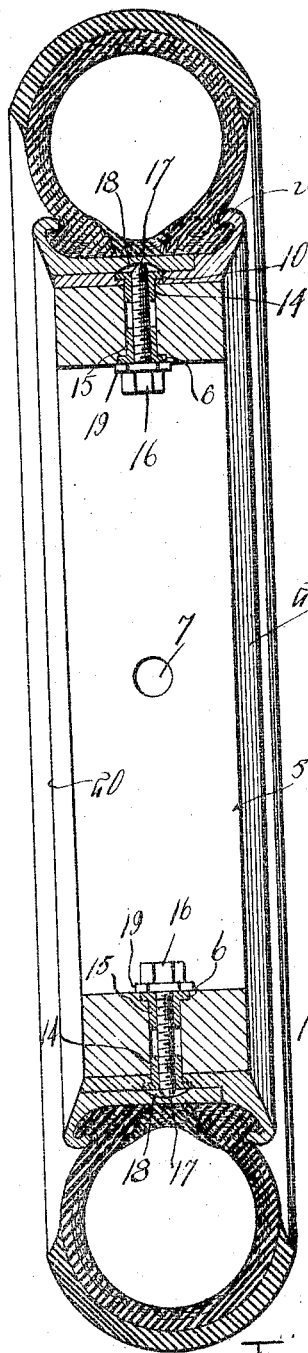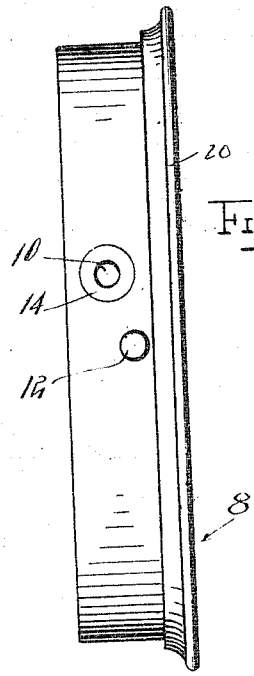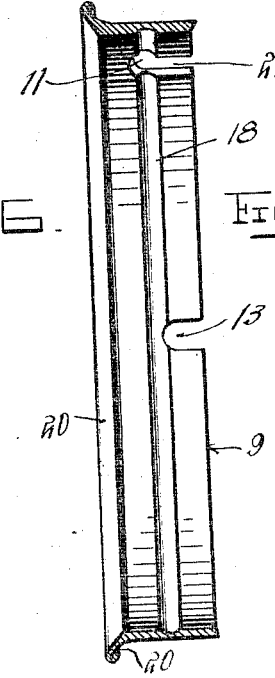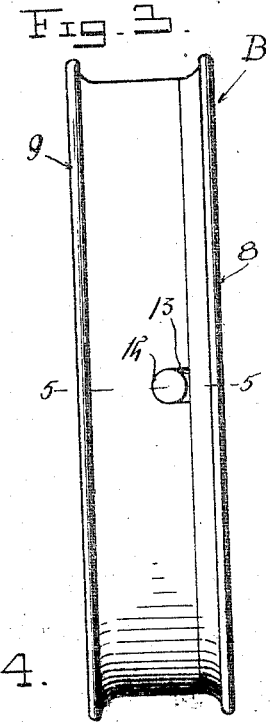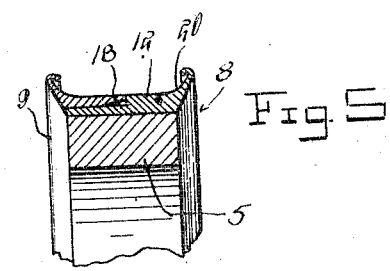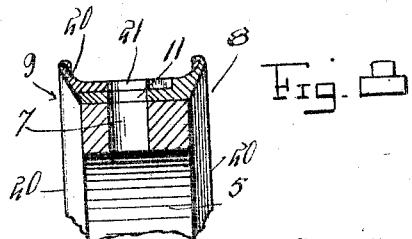

SYDNEY S. MORRIS, OF WATERTOWN, NEW YORK.

SECTIONAL RIM.

1,078,798.  Specification of Letters Patent.  Patented Nov. 18, 1913.

Application filed September 6, 1912. Serial No. 719,032.

*To all whom it may concern:*

Be it known that I, SYDNEY S. MORRIS, a citizen of the United States, residing at Watertown, in the county of Jefferson, State of New York, have invented certain new and useful Improvements in Sectional Rims; and I do hereby declare the following to be a full, clear, and exact description of the invention, such as will enable others skilled in the art to which it appertains to make and use the same.

This invention relates to new and useful improvements in sectional rims adapted for use in connection with vehicle wheels of the pneumatic type.

The principal object of the invention is to provide a sectional rim by means of which the positioning or removing of a pneumatic tire will be greatly facilitated.

Another object of the invention is to provide a sectional rim which is adapted to be attached to the felly of the wheel by a means of novel construction.

A further object of the invention is to provide a rim of the character described in which the sections are arranged one within the other and have interlocking engagement with each other whereby relative longitudinal sliding movement is prevented.

A still further object of the invention is to provide a rim of the character described which is composed of a minimum number of parts, is therefore simple in construction and is cheap to manufacture.

With these and other objects in view, the invention consists in the construction and novel combination of parts hereinafter fully described, illustrated in the accompanying drawings and pointed out in the claim hereto appended; it being understood that various changes in the form, proportion, size and minor details of construction within the scope of the claim may be resorted to without departing from the spirit or sacrificing any of the advantages of the invention.

In the drawings: Figure 1 is a side elevation showing the outer side of a wheel constructed in accordance with my invention, the tire being removed, Fig. 2 is a similar view but showing the inner side of said wheel, Fig. 3 is an edge view thereof, Fig. 4 is a transverse sectional view taken on the line 4—4 of Fig. 1, a tire being shown attached, Fig. 5 is a detail cross sectional view taken on the line 5—5 of Fig. 3, Fig. 6 is an edge view of the stationary rim section, Fig. 7 is a cross sectional view through the outer or removable section, and Fig. 8 is a detail cross section showing the valve openings.
Like reference numerals designate corresponding parts in all the figures of the drawings.

Referring to the drawings, A designates an ordinary wheel which includes the usual felly 5, said felly being formed with a pair of diametrically opposed openings 6—6 and an intermediate opening 7.

My invention comprises a sectional rim which is designated as a whole by the reference letter B, and this rim is adapted to be secured upon the felly 5 of the wheel A. This rim includes inner and outer superimposed sections 8 and 9 respectively, the former being formed with a pair of diametrically opposed openings 10—10 which register with the openings 6 of the felly 5, and with an intermediate opening 11 which registers with the opening 7 of said felly 5. Extending outwardly from the inner section 8 is a plurality of studs 12 which engage in slots 13 formed in the inner edge of the outer section 9 and serve to prevent relative longitudinal sliding movement between said sections.
In order to secure the inner section 8 to the felly 5, bushings 14 are arranged within the openings 10 of said section and the openings 6 of said felly. Other bushings 15 are inserted into the openings 6 of the felly 5 from the inner face of said felly, and a bolt 16 is then screwed through the bushing 15 and into the bushing 14. The end of the shank of the bolt is beveled as at 17 and this beveled end is positioned within a circumferential groove 18 which is formed on the inner face of the outer section 9. It will thus be observed that these bolts by their engagement with the outer section 9 prevent lateral movement of said outer section, yet permitting of said outer section to be readily removed upon the withdrawal of said bolt. In order to thoroughly lock said bolts against accidental displacement, each bolt is provided with a jam nut 19.
The outer edges of the sections 8 and 9 are formed with flanges 20—20 for receiving a pneumatic tire, and the alined openings 11 and 7 register with a slot 21 which extends inwardly from the inner edge of the outer section 9, said openings 11 and 7 and the slot 21 being adapted to receive the valve stem of the tire. By forming the slot 21, the outer section 9 may be readily removed as above described without handling said valve stem.

What is claimed is:

The combination with a wheel having a felly formed with a plurality of openings, a sectional rim comprising inner and outer superimposed sections, positioned on said felly, the inner section being formed with a plurality of openings registering with the openings of said felly, the outer section having its inner face formed with a circumferential groove registering with the openings of said inner section, bushings engaged through the registering openings of the felly and the inner section, bushings engaged in the inner ends of the openings in the felly, bolts operating in said bushings and movable into and out of the circumferential groove of the outer section, said outer section being formed with a slot extending transversely thereof and opening through its inner edge, and a stud projecting from the inner section and engaged within the slot of the outer section for locking said sections against relative axial rotation.

In testimony whereof, I affix my signature, in presence of two witnesses.

SYDNEY S. MORRIS.

Witnesses:
  MILES C. HARRINGTON,
  EDWARD K. MERRITT.